United States Patent [19]

Partipilo

[11] 4,160,240

[45] Jul. 3, 1979

[54] BINARY DIGITAL PAGER HAVING AN EIGHT FUNCTION CODE READ-OUT

[75] Inventor: Phillip Partipilo, Sunrise, Fla.

[73] Assignee: Motorola, Inc., Schaumburg, Ill.

[21] Appl. No.: 869,394

[22] Filed: Jan. 13, 1978

[51] Int. Cl.$^2$ .......................... G06F 7/02; H04L 1/10; H04M 11/02; H04Q 3/02

[52] U.S. Cl. ................................ 340/311; 340/146.2; 340/146.1 BA; 340/167 R

[58] Field of Search ............... 340/311, 164 R, 167 R, 340/146.2, 146.1 BA; 325/464, 455, 392, 55, 64; 240/146.1 C

[56] References Cited

U.S. PATENT DOCUMENTS

| | | | |
|---|---|---|---|
| 3,801,956 | 4/1974 | Braun et al. | 340/146.2 |
| 3,855,576 | 12/1974 | Braun et al. | 340/146.2 |
| 3,914,741 | 10/1975 | Bonser et al. | 340/146.1 C |
| 4,090,173 | 5/1978 | Sibley | 340/146.1 BA |

*Primary Examiner*—Donald J. Yusko

*Attorney, Agent, or Firm*—Margaret Marsh Parker; James W. Gillman

[57] ABSTRACT

A read-out of eight distinct function codes is obtained in a pager or similar device having a single two-word address code plug by creating a second, but dependent, address within the pager and transmitting one of eight possible variants of the two words of the two address codes and their complements. Two code plugs may also be used to provide two addresses with four function codes associated with each. Upon receipt of a coded address, the user is alerted, and the function code is stored in a write-over memory, available to be read-out on command unitl a new code is received. The memory can also be erased manually as desired. Display segments are scanned in sequence to conserve power, and a status check of the segments is provided at each power turn-on. Power status indication is also provided, at turn-on and at "read" command, utilizing both audio alert channels and the visual display elements.

18 Claims, 5 Drawing Figures

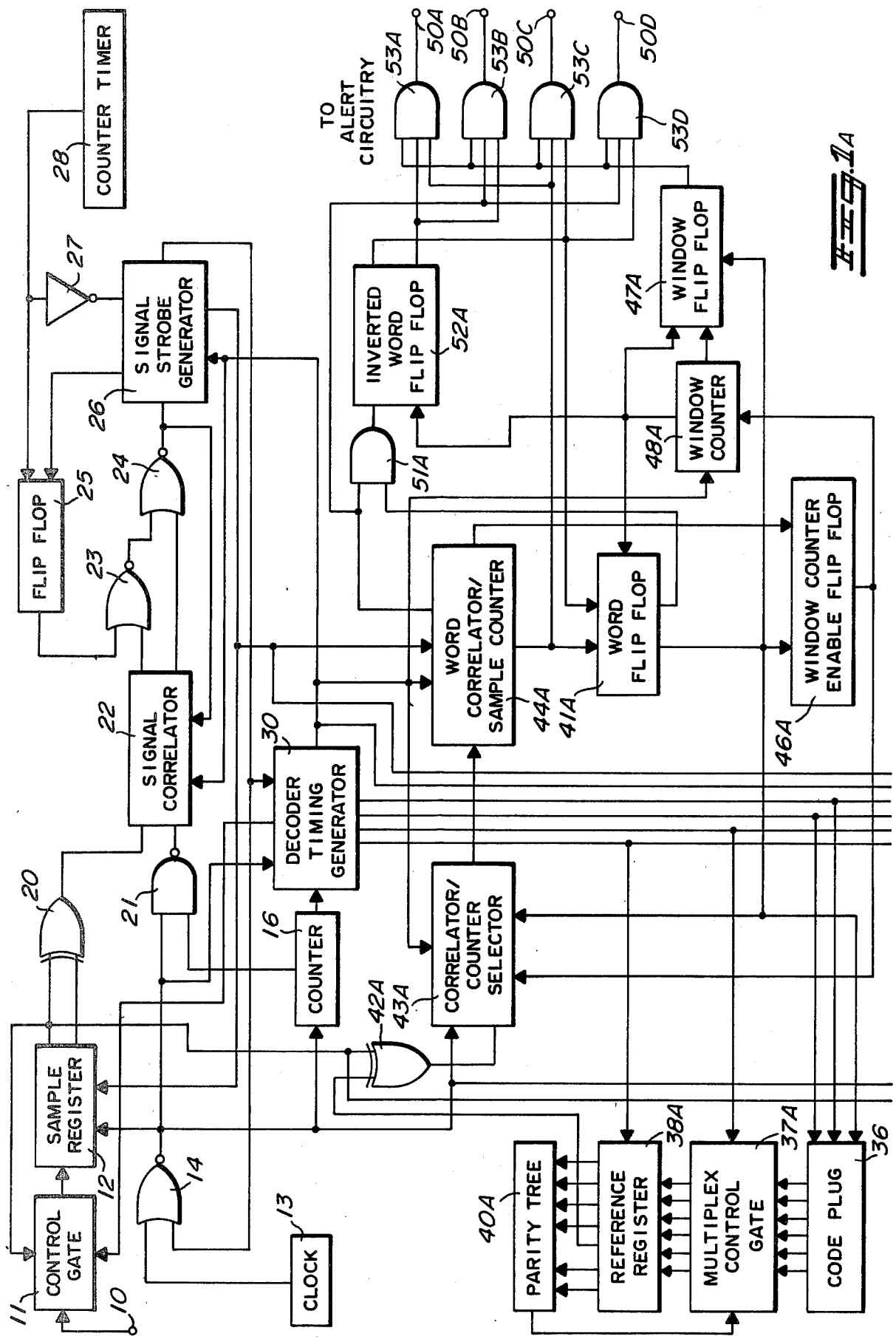

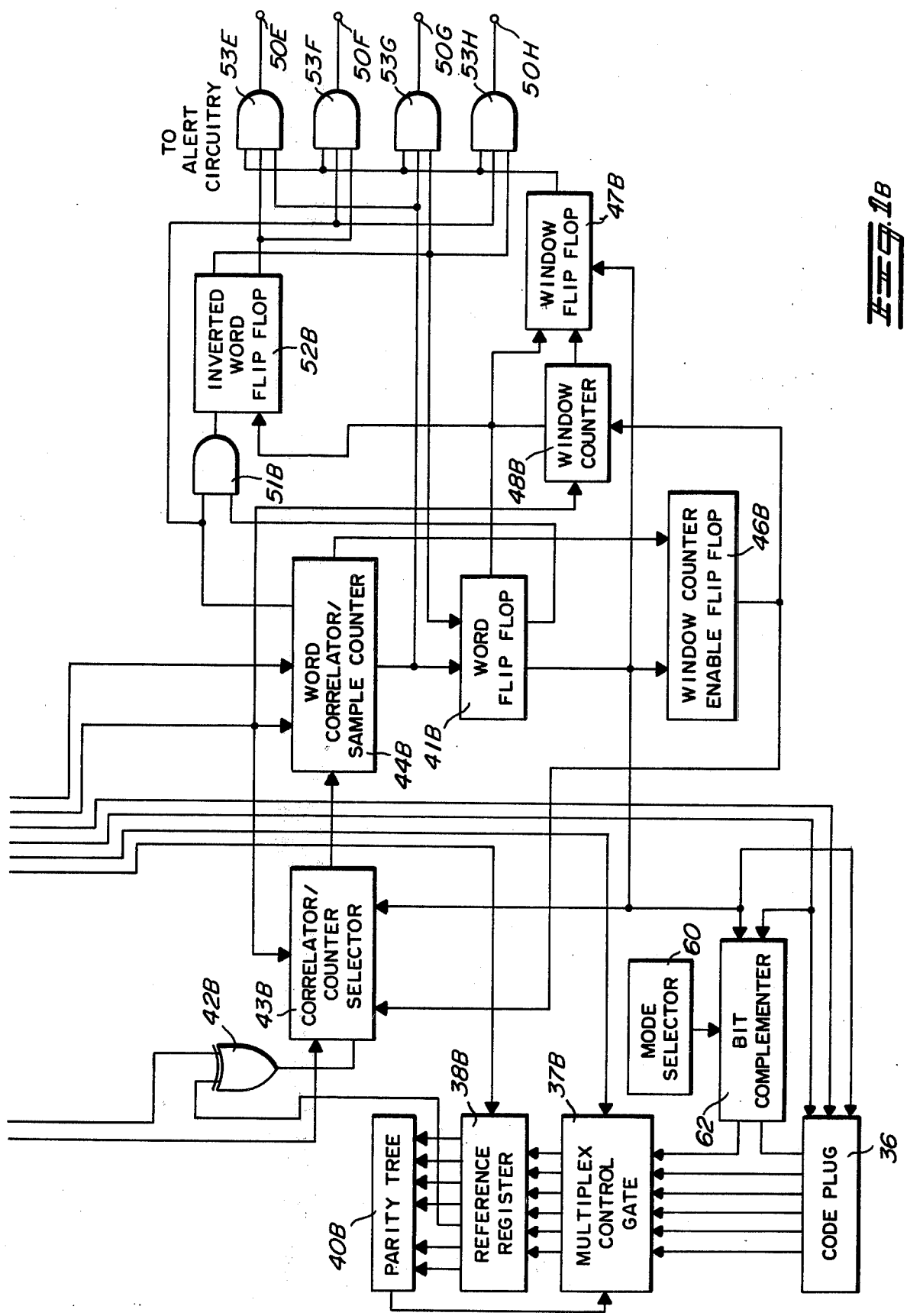

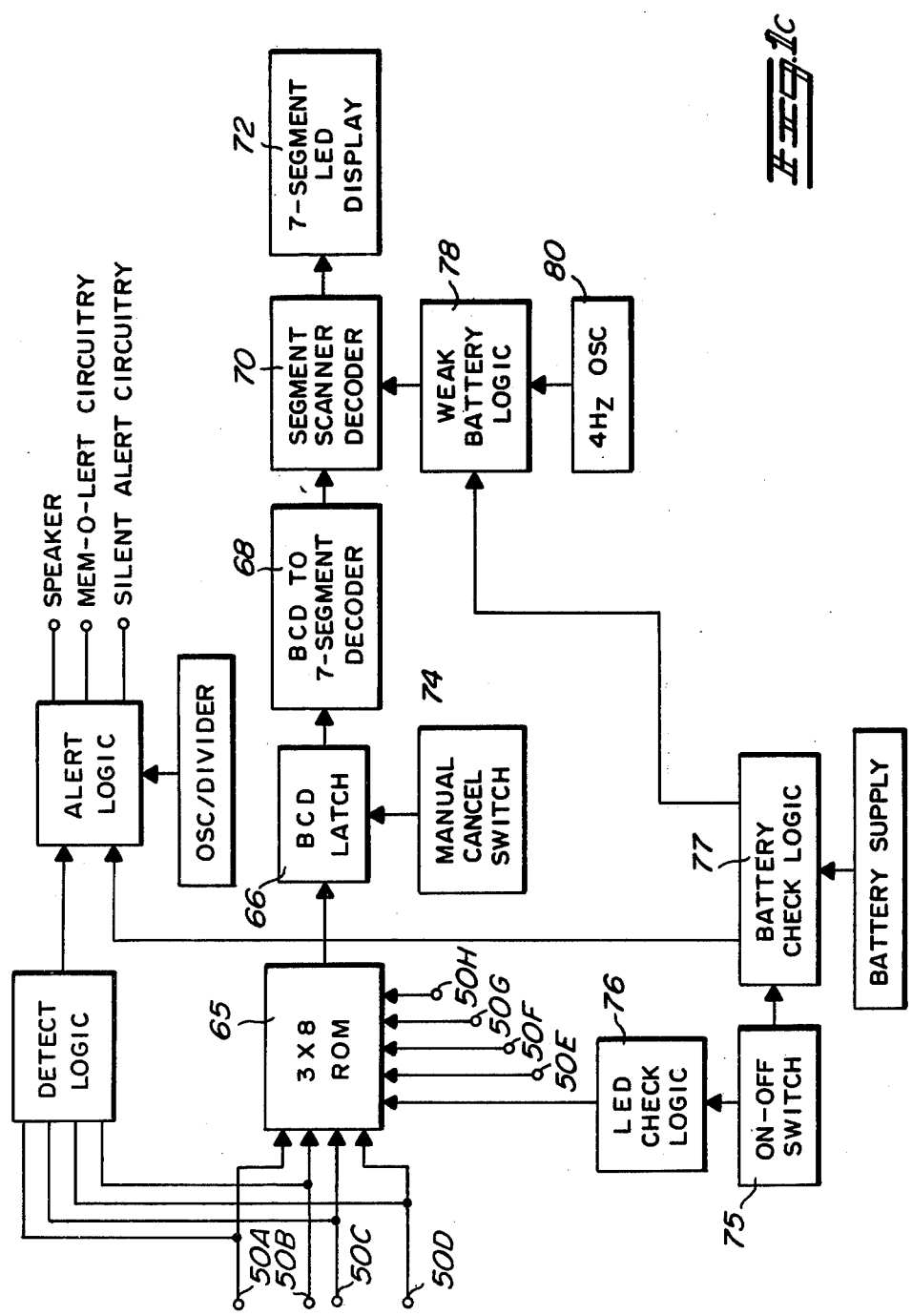

BINARY DIGITAL PAGER HAVING AN EIGHT FUNCTION CODE READ-OUT

BACKGROUND OF THE INVENTION

This invention relates to the field of pagers and similar communication devices using binary digital address codes, and more particularly, to the provision of multiple function codes encoded within the address code.

Asynchronous digital detectors which require no bit or frame synchronization in order to detect the predetermined digital word or address are presently in use and have been disclosed in U.S. Pat. Nos. 3,801,956 and 3,855,576, both assigned to the same assignee as is the present application. The first of these patents discloses a system for asynchronously detecting one code word within a stream of data bits by cycling the sampled bits of the received data in parallel with the bits of the stored code address word, then counting the number of correlations. The second referenced patent discloses a system using asynchronous detection of the first address word to provide synchronizaton for detection of the second word. Thus only the first word need be one of a cyclic subset, and a large number of code addresses are made available. These same detection methods are also utilized in data terminals, where the address is followed by the transmission of a message or instruction, also in binary code. Data or message transmission in tone sequential pagers has been limited since two different tone signals are about the maximum that the user's ear and memory can distinguish. In the second patent referenced above, a technique is shown for encoding the address code to provide a maximum of four possible function codes. This technique involves transmitting one of the four possible combinations of the two words of the address and their complements, detecting the four combinations and providing parallel outputs for each detect circuit, but it has proven desirable to provide more than four function codes without adding another code plug.

It is also desirable to provide a pager with the above capability, which can be easily converted to use with two code plugs, and with four function codes associated with each separate address. Other useful features would be a status check for the individual elements of the visual display and for the power supply status.

SUMMARY OF THE INVENTION

It is an object of the present invention to provide multiple function codes within the asynchronously detected address code of a device using a digital binary address code.

It is a particular object to provide up to eight such function codes while requiring only a single code plug.

It is another object to provide such a device having the capability of utilizing a second code plug when desired.

It is another object to provide such a device with sequential scanning of the display elements, in order to conserve power.

It is another object to provide for a status check on the display elements with each power turn-on.

It is still another object to provide a battery status indication utilizing both audio and visual indicators.

The above objects and others are provided in a communications device such as a personal pager having register circuitry wherein the incoming stream of data bits is received and sampled, and the sampled bits are cycled therethrough. A storge device such as is usually termed an address code plug, stores data bits and can, with the aid of a second register and a parity tree, reconstruct the original address code. A third register and second parity tree are also coupled to the storage device for constructing an address code which differs from but is related to the original address code. The second and third registers are coupled to bit correlators which compare the sampled bits of the received data with the bits of the address code in one of the second or third registers. The number of correlations is counted as the bits of one register are cycled past the bits of the received data and, upon reaching a number indicating that the received word and stored word match, an output signal is provided. If, instead, a number is reached indicating that the received word is the complement of the stored word, a different output is provided. After either of these output signals, a period of time is counted which is approximately equal to the transmission time for a (second) address word. At the end of this first period of time, a shorter period of window is counted during which both correlators being comparing the newly received data bits with the second word of each address code, i.e., the original and the derived ones. Again a signal output is provided if either of the required numbers of correlations is reached. Four possible combinations of address words and their complements are therefore possible for each of the second and third registers. Thus, by transmitting the appropriate variant of the original address code, eight separate function codes may be provided in a device having only a single code plug. If, however, it is desired to convert such a device to use with two code plugs, providing thereby two distinct and independent addresses, the second code plug would merely be inserted, and a switch thrown to disconnect the first code plug from the third register and cause the third register to develop the exact address code indicated by the second code plug. Thus, the device is converted easily to use with two distinct addresses, with up to four function codes available with each.

In either case, the signals provided in response to the various correlation possibilities are processed in further logic circuitry in order to provide a unique indication for each possibility. These indications may take the form of numerical read-outs on a visual display such as a 7-segment LED device. Any function code which is decoded is stored in a memory, the user is alerted, and the code will be indicated on the display at the user's command. This code will remain in the memory until another code is received, or until it is manually erased.

Other features of the invention include sequentially scanning the elements of the display device while in use, to conserve battery power, and status check of the elements and of the power source at turn-on, and of the power source during each function "read-out".

BRIEF DESCRIPTION OF THE DRAWINGS

FIGS. 1a, 1b and 1c comprise the three portions of a block/logic diagram of a communication device utilizing the present invention.

DETAILED DESCRIPTION OF THE PREFERRED EMBODIMENT

Figure 2A:
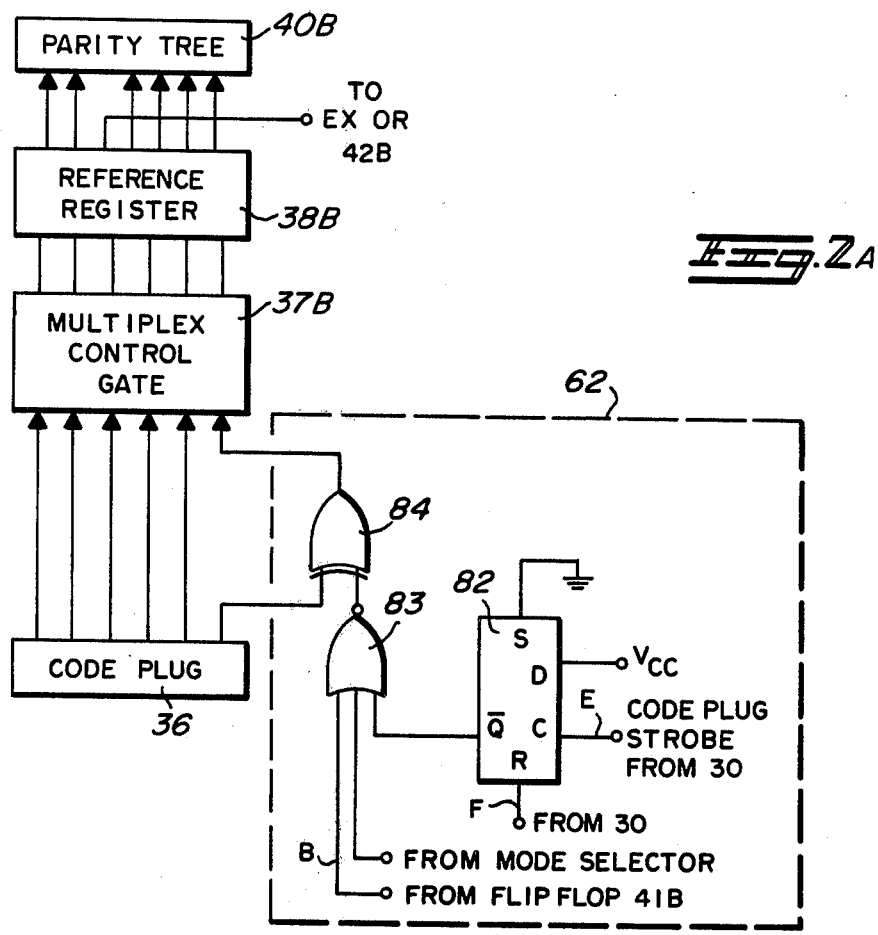
FIG. 2A is a block/logic diagram of a portion of FIG. 1B.

The circuit of FIG. 1A is taken, essentially unchanged, from U.S. Pat. No. 3,855,576. The drawing is used in this form to facilitate reference to that patent, should further details be desired.

The circuit of FIG. 1B is, to a large degree, a duplicate of portions of the circuitry of FIG. 1A, but the differences will be discussed in detail hereinbelow. The circuitry of FIG. 1C couples to the outputs of FIGS. 1A and 1B.

As described in the last mentioned patent, the detector circuit detects asynchronously, that is, with no preamble or framing required, an individual address code as for a pager, consisting of two 23-bit binary "words". Detection of word one is accomplished by cycling the received data bits and the bits of word one of the stored address code through a comparator and counting the correlations between bits. The detection of word one serves to "sync", the detection of word two. The combination of asynchronous word one detection and synchronous word two detection allows over four hundred thousand different two-word addresses in a single system. The circuitry of the present invention is adapted to be used with the address detector of the above-referenced patent and is described here in that environment. It is also described herein as within the context of a pager of the type worn upon the person of the user. It will be obvious to anyone skilled in the art that the invention could be utilized in other applications and that the environment of a pager is only exemplary.

The upper part of FIG. 1A will be described in general terms only inasmuch as it has been fully disclosed in the last mentioned patent. Sufficient description is given here for complete understanding of the present invention. The signal A of FIG. 2B, received at the input terminal 10 of the detector of FIG. 1A, may have been broadcast, received, demodulated, amplified and limited in any suitable fashion, but for use in this detector, it will now consist of a train of binary digital signals or bits. In this train of signals there may be an individual page address made up of two different 23-bit binary words spaced apart by one-half bit.

The present invention involves encoding the address code to form an integral function code; i.e., the pager may be alerted by any one of eight forms of the address, these being decoded after the address detection. For ease of understanding, however, the system will first be described in terms of decoding the basic or original address code to provide a simple page alert. Signals of the type shown in A of FIG. 2B, are coupled through a control gate 11 to a sample register 12. A clock 13, running at four times the received bit rate, is coupled through a NOR gate 14 to the register 12 for sampling each received bit four times and shifting the sampled bits through the register. The clock 13 is also coupled to a counter or divider 16 wherein the clock frequency is divided by two and by four. The portion of FIG. 1A including the NOR gate 14, exclusive (EX) OR gate 20, NAND gate 21, signal correlator 22, NOR gates 23 and 24, flip-flop 25, signal strobe generator 26, inverter 27, and counter timer 28 provide primarily a battery saver function and for the purposes of this description it is only necessary to have a signal from the signal strobe generator 26 enabling clock pulses from the clock 13 to be passed through the NOR gate 14 for enabling the signal E of FIG. 2B. Signal E will be discussed below in detail.

A decoder timing generator 30 is coupled to an output of the counter 16 from which is received one pulse for every four master clock pulses. The generator 30 is also coupled to the output of the NOR gate 14 and to the output of the signal strobe generator 26. Control signals from the decoder timing generator 30 provide most of the timing for the detector of FIGS. 1A, 1B and 1C. The address code assigned to the individual pager is stored in a code plug 36, twelve bits for each of the two words. A multiplex control gate 37A controls the coupling of each group of six bits to a reference register 38A. A parity three 40A is coupled to the reference register 38A and to the multiplex control gate 37A for adding eleven parity bits after the stored twelve bits of each word. Such parity trees and the techniques for using parity bits to provide essentially "falsing free" detection are well known in the art and need not be explained here. The only point requiring emphasis here is that from the 12 bits of data stored in the code plug 36, one unique 23 bit address is constructed, the only exception being a deliberate circumvention of the process, as shown hereinbelow. Also coupled to the code plug 36 is an output (signal B) of a word flip-flop 41A, which changes level when the first address word has been detected and it is desired to look for the second word within the train of input signals. The level of the word select signal B, applied to an input of the code plug 36, determines which one of the stored words can be transferred to the register 38A. One output signal (D of FIG. 2B) from the decoder timing generator 30 is termed "code group select signal" and has one pulse during each sampling period. The level of signal D determines whether the first or second group of six bits of the enabled word is to be coupled to the register 38A. Another output signal E, termed "code plug strobe", triggers the entry of the chosen six bits into the register 38A and it consists of a pair of pulses during each sampling period. The signals B, D and E are coupled to the circuit of FIG. 1B also.

Individual alerts are obtained asynchronously in the circuit of FIG. 1A by first comparing the received binary signals with the stored bits for the individual address codes. Each of te received bits is sampled four times and stored in the sample register 12, comprising 92 stages. Assuming that all 92 stages contain temporarily stored data bits, the bits will be inverted, then coupled to an EXOR 42A as will the 23-bits of the word in the reference register 38A. Each bit from the register 38A will be compared with four bits from the sample register 12. The output of the EXOR 42A is coupled to a correlator/counter selector 43A. At this point in the sequence the selector couples the correlation counts to a word correlator/sample counter 44A. All of the above described comparisons will take place during one sampling period. After each comparison, the sampled bit in stage 92 of the sample register 12A is cycled back to the first stage. After four comparisons, the compared bit in the reference register 38A is also cycled. After 92 comparisons, the bit in the last stage of the sample register 12A is lost, a new sample is inserted into the first stage, and a new set of comparisons is made, the pattern being repeated until word one is detected. At word one detect, the word select signal B from the word flip-flop 41A changes level, the code plug 36 develops word two in the storage register 38A, the correlator/counter selector 43A stops coupling error signals to the counter in the word correlator sample counter 44A and instead couples a pulse from the decoding timing generator 30 during each sample bit period. The B signal also sets a window counter enable flip-flop 46A and a window flip-flop 47A for subsequent operation. At count 92, i.e., 92 samples after the word one detect, the window counter 48A triggers window flip-flop 47A, whose output is the three count window (signal C) of FIG. 2B and if word two is detected on counts 93, 94 or 95, a page alert signal is provided to one of the terminals 50. During the three count window, the same comparison and correlation technique is used to detect word two as was used to detect word one. At the 95 count, the window flip-flop 47A is reset by the window counter 48A, and the work flip-flop 41A and window counter enable flip-flop 46A will also be reset. If word two was not detected during the 92-95 count window, the detector will again look for word one.

The explanation above covers the detection of only the basic address code, which may be termed AB for the first and second words of the address. However, the correlator/counter selector 43A and word correlator/sample counter 44A are programmed to detect not only A and B but $\bar{A}$ and $\bar{B}$. When counting correlations, or miscorrelations as the case may be, it is apparent that less than a given number of differences between the two sets of bits would indicate that the desired word has been detected, and further errors would indicate that it has not been detected. However, if a large enough number of errors is detected this would indicate that the complement of the desired word has been detected. Thus the detection device will register detection of either word A or word $\bar{A}$, followed by detection of either B or $\bar{B}$, giving four possible address codes which can be detected by the same detector.

It is of course necessary that the four variations of the address codes be individually indicated in some manner. In FIG. 1A an AND gate 51A is coupled to an output of the word correlator/sample counter 44A and also to an output of the word flip-flop 41A. The output of the AND gate 51A is coupled to an inverted word flip-flop 52A having two outputs. One of these outputs stays "high" after a word A detect and is coupled to AND gates 53A and 53B. A second output of the inverted word flip-flop 52A stays "high" after $\bar{A}$ is recognized and this indication is coupled to AND gates 53C and 53D. The output from the word correlator/sample counter 44A which is coupled to the AND gate 51A is also coupled to the AND gates 53B and 53D, this output being "high" at $\bar{A}$ or $\bar{B}$ detect. Another output of the word correlator/sampl counter 44A is coupled to the AND gates 53A and 53C, and this output is "high" when B is recognized. Finally, each of the AND gates 53A, B, C and D has an input from the window flip-lop 47A which is "high" only during the second word detect window. Thus the point 51A will have an output upon detect of $A\bar{B}$, point 50B will have an output upon detect of AB, point 50C will have an output upon detect of $\bar{A}B$, and point 50D will have an output upon detection of $\bar{A}\bar{B}$.

In FIG. 1B, most of the blocks are duplicates of parts already described in relation to FIG. 1A and thus bear corresponding reference numerals with B suffix. Note that the code plug 36 shown in FIG. 1B is the same code plug 36 as in FIG. 1A, thus bears no suffix. Briefly, the same input signals from the input terminal 10 in sample register 12 are coupled to an EXOR 42B for comparison with the stored address code, and the circuitry from there on operates as did the corresponding portions of FIG. 1A. Added to the circuitry to FIG. 1B however, are a mode selector 60 and bit complementer 62. The mode selector 60 is a switching circuit for providing capability of using a separate and distinct code plug for the circuit of FIG. 1B rather than the code plug 36 of FIG. 1A. Its function is to disable the bit complementer 62 and accomplish the switching of the appropriate code plug connections. The bit complementer 62 will be described in detail with respect to FIG. 2A. For the purpose of the present description it is only necessary to not that one of the bit input lines from the code plug 36 does not go directly to the multiplex control gate 37B as do the other five input lines, but instead is coupled through the bit complement wherein the least significant bit of word two of the address code is changed to its complement, thus providing a second address from the code plug 36, which is non-identical but dependent upon the original address. The independent address has been termed AB and the dependent address will be termed AC. Thus at the four AND gates 53C, F, G and H, the outputs will, corresponding to FIG. 1A, be representative of detection of signals AC, $A\bar{C}$, $\bar{A}C$, and $\bar{A}\bar{C}$.

In FIG. 1C the eight outputs (50A-H) of FIGS. 1A and 1B are coupled to a 3×8 read only memory (ROM) 65 which provides an output to the BCD latch 66. The binary coded decimals are coupled to the BCD-to-7-segment decoder 68 and thence to a segment scanner decoder 70 for operation of a 7-segment LED display 72. Thus each of the eight outputs from the detection circuits of FIGS. 1A and B is processed through to become the enabling signal for one specific combination of segments in the LED display. The signal from point 50A would, for example, cause a "1" to be displayed, a signal on point 50B would cause a "2" to be displayed, etc. It should be mentioned that if no function code is in the memory when the memory is interrogated, a "0" will be displayed. A manual cancel switch 74 is coupled to the BCD latch 66 for providing the option of manually erasing a function code from the memory, otherwise the code is retained until a new code is received (write-over memory). The segment scanner decoder 70 provides for sequentially firing the segments of the LED display when it is enabled, in order to conserve power, this being highly desirable in small portable communications devices. An on/off switch 75 is shown as providing activation of two functions. In one case, LED check logic circuitry 76 is activated upon power turn-on, enabling all segments of the LED including the decimal point for a brief status check of the display device. The on/off switch also is coupled to batter check circuitry 77 for providing a status check of the supply voltage upon turn-on. This is preferably done through the audio circuitry and consists of a single alert tone in the case of sufficient battery volume and a multiplexed pair of tones in case of weak battery. In the case of a weak battery condition during the course of operation, weak battery logic circuitry 78 couples a four Hz signal from an oscillator 80 to the segment scanner decoder 70, whereby the LED display is caused to flicker at a perceptible rate.

Figure 2B:
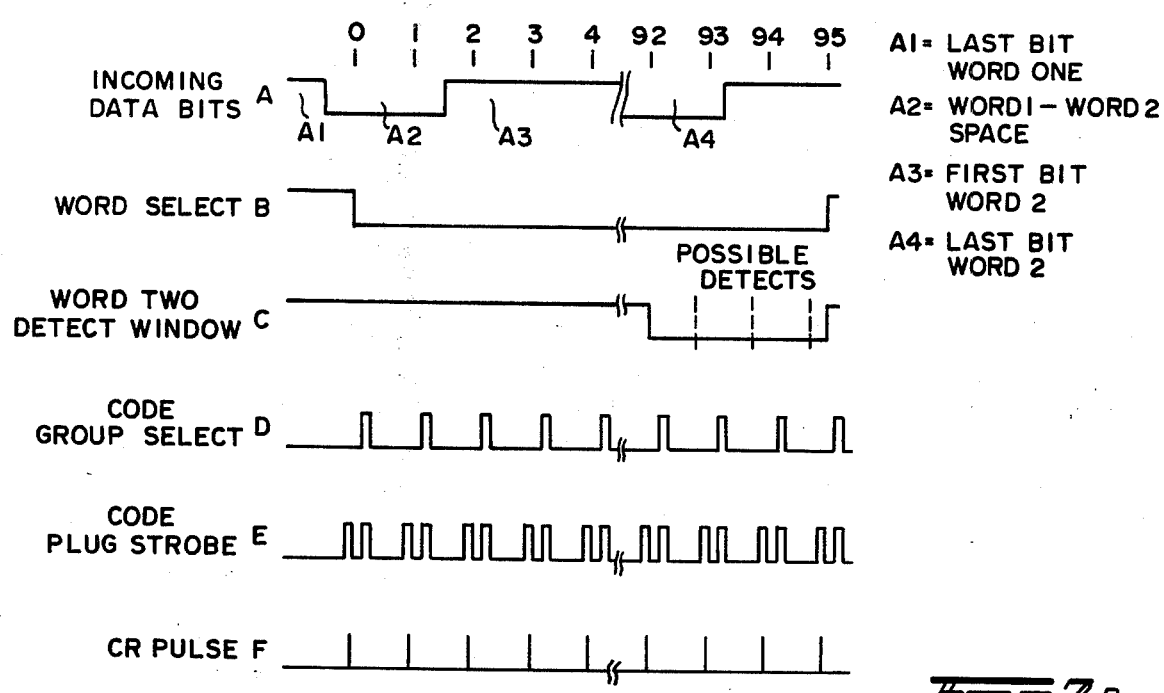
FIG. 2B is a timing chart including some of the pertinent signals in the circuitry of FIGS. 1A, 1B and 2A.

FIG. 2A is a further delineation of a portion of FIG. 1B, namely the bit complementer 62 and the closely associated parts of the circuit. As shown a preferred embodiment of the bit complementer 62 may include a D type latch 82, a NOR gate 83 and EXOR gate 84. Other configurations of logic circuitry could of course provide equivalent circuitry. As may be seen in FIG. 2A, the latch 82 has on its reset input the signal F (FIG. 2B), which is the CR pulse which initiates each comparison cycle in the detector. The set input is grounded and the data input is "high". On the clock input is the signal E, termed code plug strobe. As mentioned hereinabove, the signal E is also used to activate the insertion of each pair of six bits of the stored address words into the multiplex control gate. Thus at the beginning of each comparison cycle, the latch would be reset and the following or second pulse of each pair of strobe signals E would clock the latch 82. The $\bar{Q}$ output of the latch 82 is coupled to one input of the NOR gate 83, and is a "low" each time the second six bits of a word is to be inserted into the reference register 38B. The NOR gate 83 has two other inputs, with the one from the mode selector 60 always being low unless operation with two separate code plugs is desired. The third input to the NOR gate 83 is the signal B from the word flip-flop 41B and is "high" until detection of word one. At word one detection, signal B goes "low" and the NOR gate 83 will output a "high" to the EXOR gate 84 during each second pulse of the signal E. Thus the input to the EXOR gate 84 from the code plug 36 will be inverted at the gate output and the multiplex control gate 37B, the reference register 38B and parity tree 40B will derive word C instead of word B.

Thus, in accordance with the invention, there has been provided expanded function code capability for a pager or other communication device having a single code plug but with the capability of utilizing two code plugs. It would be obvious to anyone skilled in the art that the principle of the bit complementer providing a dependent address could be expanded to include other variations of the original address and, with the aid of a more elaborate display, an extended number of function codes could be provided. It is also apparent that audio means could be substituted for the visual display shown, although the visual display is the preferred embodiment. It is therefore contemplated to include all of such variations and modifications of the present invention as fall within the scope of the appended claims.

What is claimed is:

1. In a communications device for responding to a predetermined two-word binary address code within a stream of received data bits, logic circuitry for providing multiple function code displays comprising in combination;
    first register means for sampling and temporarily retaining the received data bits;
    storage means for permanently retaining binary address code data;
    first circuit means coupled to the storage means for receiving the address code data and deriving therefrom the predetermined two-word address code;
    second circuit means coupled to the storage means for receiving the address code data and deriving therefrom an address code related to the predetermined address code;
    first comparator means for comparing the received data bits and the bits of the predetermined address code and for providing a first output signal indicative of substantial agreement therebetween;
    second comparator means for comparing the received data bits and the bits of the address code related to the predetermined address code and for providing a second output signal indicative of substantial agreement therebetween;
    indicator means for providing different indications in response to the first and second output signals.

2. A communications device in accordance with claim 1 and wherein the first comparator means provides a different output signal indicative of substantial agreement between the bits of the received data and the bits of the complements of at least one of the words of the predetermined address code, wherein the second comparator means provides still a different output signal indicative of substantial agreement between the bits of the received data and the bits of the complements of at least one of the words of the address code related to the predetermined address code, and wherein the indicator means provides a different indication in response to each said output signal.

3. A communications device in accordance with claim 1 wherein the indicator means is a visual display.

4. A communications device in accordance with claim 1 wherein the indicator means includes an array of light emitting diodes, and the different indications are numerical displays.

5. In a communications device for responding to a predetermined two-word binary address code within a stream of received data bits, logic circuitry for providing multiple function code displays comprising in combination:
    first register means for sampling and retaining the received data bits;
    storage means for retaining binary address code data;
    second register means coupled to the storage means for receiving the binary address code data and deriving therefrom the predetermined binary address code;
    third register means coupled to the storage means for receiving the binary address code data and deriving therefrom a binary address code related to the predetermined binary address code;
    first correlating means for comparing output bits from the first register means with the bits of the first word from the second register means and providing a first output signal in response to a first predetermined number of correlations, and a second output signal in response to a second predetermined number of correlations;
    first timing means for providing a first time period substantially equal to the transmission time of one address word in response to either the first or second output signals from the first correlating means, and a second time period subsequent to the first time period and substantially shorter than the first time period, the first correlating means comparing output bits from the first register means with the bits of the second word in the second register means only during the second time period and providing a third output signal in response to the first predetermined number of correlations and a fourth output signal in response to the second predetermined number of correlations;
    first logic circuitry for recognizing combinations of the four possible output signals from the first correlating means;
    second correlating means for comparing output bits from the first register means with the bits of the first work in the third register means and providing a fifth output signal in response to the first predetermined number of correlations, and a sixth output signal in response to the second predetermined number of correlations;

second timing means for providing the first period in response to either output signal from the second correlating means and for providing the second and subsequent time period, the second correlating output means comparing output bits from the first register means with the bits of the second word in the third register means only during the second time period and providing a seventh output signal in response to the first predetermined number of correlations and an eighth output signal in response to the second predetermined number of correlations;

second logic circuitry for recognizing combinations of the four possible output signals from the second correlating means; and indicator means coupled to the first and second logic circuitry for providing one of eight distinct indications in response to each one of the eight possible output signals.

6. A communications device in accordance with claim 5 wherein the second and third register means each include a multiplex control gate, a reference register and a parity tree and the third register means further includes means for altering at least one of the bits received from the storage means.

7. A communications device in accordance with claim 6 wherein the means for altering the at least one received bit changes the said bit into the complement of said bit.

8. A communications device in accordance with claim 5 wherein the indicator means includes a visual display.

9. A communications device in accordance with claim 8 wherein the eight distinct indications are represented by numerical symbols.

10. A communications device in accordance with claim 8 wherein the visual display comprises a 7-segment light-emitting-diode display.

11. A communications device in accordance with claim 10 and further including scanning means for scanning the display elements in sequence for power conservation.

12. A communications device in accordance with claim 8 and further including third logic circuitry coupled to the indicator means for enabling all portions of the visual display for a brief period following power turn-on.

13. A communications device in accordance with claim 5 and further including circuitry coupled to the first and second correlating means for providing an audible indication in response to any of the possible output signals.

14. A communications device in accordance with claim 5 wherein the indicator means includes memory means for storing information corresponding to an output signal from one of the correlating means until another output signal is provided or until the stored information is manually erased.

15. A communications device in accordance with claim 5 and further including fourth logic circuitry for providing an indication of power source status.

16. A communications device in accordance with claim 15 and further including circuitry for providing audible indications, and wherein a first audible signal is provided at power turn-on when the power level is satisfactory and a second and distinct audible signal is provided if said level is unacceptable.

17. A communications device in accordance with claim 16 and further including circuitry coupled to the indicator means for causing a perceptible change in any displayed indication whenever the power source level is unacceptable.

18. A communications device in accordance with claim 17 and wherein the circuitry coupled to the indicator means includes a very low frequency oscillator and means for controlling the indicator at the signal rate of the oscillator.

* * * * *